United States Patent
Pokrinchak et al.

(10) Patent No.: US 6,252,905 B1
(45) Date of Patent: Jun. 26, 2001

(54) REAL-TIME EVALUATION OF COMPRESSED PICTURE QUALITY WITHIN A DIGITAL VIDEO ENCODER

(75) Inventors: Stephen P. Pokrinchak, Owego, NY (US); Charles J. Stein, Peckville, PA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/020,904

(22) Filed: Feb. 5, 1998

(51) Int. Cl.[7] ................................................ H04B 1/66
(52) U.S. Cl. ................................................ 375/240.14
(58) Field of Search ............................. 348/400.1, 404.1, 348/405.1, 411.1, 412.1, 416.1; 375/240, 240.14; 382/240.03, 232, 234; H04N 7/36; H04B 1/66

(56) References Cited

U.S. PATENT DOCUMENTS

| | | | |
|---|---|---|---|
| 4,388,638 | 6/1983 | Dischert et al. | 358/27 |
| 5,109,417 | 4/1992 | Fielder et al. | 381/36 |
| 5,136,377 | 8/1992 | Johnston et al. | 358/136 |
| 5,142,656 | 8/1992 | Fielder et al. | 381/37 |
| 5,161,210 | 11/1992 | Druyvesteyn et al. | 398/2 |
| 5,166,981 | 11/1992 | Iwahashi et al. | 381/36 |
| 5,185,800 | 2/1993 | Mahieux | 381/29 |
| 5,214,507 | 5/1993 | Aravind et al. | 358/133 |
| 5,252,973 | 10/1993 | Masuda | 341/131 |
| 5,291,557 | 3/1994 | Davis et al. | 381/22 |
| 5,301,205 | 4/1994 | Tsutsui et al. | 375/1 |
| 5,367,629 | 11/1994 | Chu et al. | 395/162 |
| 5,381,143 | 1/1995 | Shimoyoshi et al. | 341/51 |
| 5,412,484 | 5/1995 | Yoshikawa | 358/433 |
| 5,434,622 | * 7/1995 | Lim | 348/400 |
| 5,438,643 | 8/1995 | Akagiri et al. | 395/2.1 |
| 5,440,344 | 8/1995 | Asamura et al. | 348/405 |
| 5,475,789 | 12/1995 | Nishiguchi | 395/2 |
| 5,525,984 | 6/1996 | Bunker | 341/131 |
| 5,666,461 | * 9/1997 | Igarashi et al. | 386/95 |
| 5,729,625 | * 3/1998 | Miyake | 382/169 |
| 5,777,812 | * 7/1998 | Kim | 360/48 |
| 5,978,029 | * 11/1999 | Boice et al. | 348/412 |
| 6,020,934 | * 2/2000 | Greenfield et al. | 348/699 |
| 6,023,296 | * 2/2000 | Lee et al. | 348/405 |
| 6,078,689 | * 6/2000 | Kunitake et al. | 382/232 |

\* cited by examiner

*Primary Examiner*—Howard Britton
*Assistant Examiner*—Tung Vo
(74) *Attorney, Agent, or Firm*—William Steinberg, Esq.; Heslin & Rothenberg, P.C.

(57) ABSTRACT

Method, system and computer program product are provided for real time evaluation of compressed picture quality, in hardware, software or a combination thereof, during encoding of a sequence of video data. A received video signal is encoded by quantizing the signal after frequency transformation to produce a quantized video signal which is automatically evaluated in real time for data loss. Loss statistics, representative of picture quality of the quantized video signal, are generated for comparison with, for example, a predefined threshold as a dynamic control over outputting of the quantized video signal to the encode pipeline. As an enhancement, multiple quantizers are employed in parallel, each using a different quantization scale to produce multiple different quantization signals. The multiple quantization signals are evaluated in real time for picture quality and an optimum signal is selected for forwarding within the encode pipeline.

38 Claims, 7 Drawing Sheets

REAL-TIME EVALUATION OF COMPRESSED PICTURE QUALITY WITHIN A DIGITAL VIDEO ENCODER

CROSS-REFERENCE TO RELATED APPLICATION

This application is related to co-pending, commonly assigned U.S. patent application Ser. No. 08/859,544, filed May 20, 1997, entitled "Macroblock Bit Regulation Schemes For Video Encoder," which is hereby incorporated herein by reference in its entirety.

TECHNICAL FIELD

This invention relates in general to an apparatus and method for encoding digital visual images including spatial (intra-picture) and temporal (inter-picture) compression, that is reducing both redundancy within a picture and redundancy between pictures. Redundancy within pictures is reduced, or even eliminated, by the use of the discrete cosine transform, quantization, and variable length encoding. Redundancy between pictures is reduced, or even eliminated, by the use of motion vectors. One aspect of intra-picture compression comprises bit regulation to achieve an optimized bit rate while still maintaining picture quality and detail. This invention is specifically directed to real-time encoding with compressed picture quality evaluation for optimal, dynamic encoding of video data within a variable bit rate bandwidth capability.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, and variable length coding. Video compression between pictures is accomplished via a process referred to as motion estimation and compensation, in which a motion vector plus difference data is used to describe the translation of a set of picture elements (pels) from one picture to another.

The ISO MPEG-2 standard specifies only the syntax of bitstream and semantics of the decoding process. The choice of coding parameters and tradeoffs in performance versus complexity are left to the encoder developers.

One aspect of the encoding process is compressing a digital video image into as small a bitstream as possible while still maintaining video detail and quality. The MPEG standard places limitations on the size of the bitstream, and requires that the encoder be able to perform the encoding process. Thus, simply optimizing the bit rate to maintain desired picture quality and detail can be difficult.

For example, a bit rate is defined in bits per second. Based on the frame rate and type of picture being encoded, a number of bits per picture is assigned. At 6,000,000 bits per second (6 Mbps), and pictures at 30 picture frames per second, each picture would be allocated 200,000 bits assuming that the bits are allocated uniformly. With a 720×480 picture having 1350 macroblocks, this translates into 148 bits allocated per macroblock. Thus, in the case of scene changes and action videos, the bit rate can be quickly consumed with drastic changes between macroblocks and/or between frames. Picture quality and detail can suffer as a result.

Video compression requires advanced techniques to achieve the highest amount of compression, while still obtaining a desired picture quality. Variable bit rate (VBR) encoding is an option in video compression that allows for each compressed picture to have a different amount of bits based on complexity of intra and inter-picture characteristics. For example, a scene with simple picture content (such as a color test pattern) will require significantly less bits to encode than a scene with complicated picture content (such as a crowded city street) in order to obtain desired picture quality. Because of the amount of information that is needed to characterize the video and the complexity of the algorithms needed to interpret the information to effectively enhance the encoding process, VBR encoding is conventionally accomplished in a non-real-time, two or more pass encoding process. In a first pass, statistics are gathered and analyzed, and in a second pass, the results of the analysis are used to control the encoding process. Although this produces high quality encoding, it does not allow for real-time operation.

This invention seeks to monitor or predict picture quality of a partially encoded video sequence within an encoder in order to optimize picture quality in real time within the video encoding system.

DISCLOSURE OF THE INVENTION

Briefly summarized, the invention comprises in a first aspect a method for encoding a sequence of video data. The method includes compressing the sequence of video data to produce a compressed signal by: compressing the sequence of video data n times, wherein $n \geq 1$, each compressing employing at least one different compression parameter, thereby producing n different compressed video signals; evaluating picture quality of the n compressed video signals; and automatically selecting one of the n compressed video signals for output as the compressed signal, the automatically selecting of one compressed video signal for output being based on the evaluating of picture quality of the n compressed video signals.

In another aspect, the invention comprises a method for encoding a video signal which includes encoding the video signal by: compressing the video signal to produce a compressed video signal; and automatically evaluating in real time data loss resulting from the compressing of the video signal and producing therefrom loss statistics representative of picture quality of the compressed video signal, wherein the automatic evaluating occurs during encoding of the video signal.

In still another aspect, the invention comprises a digital video encoder having a quantization subsystem for compressing a sequence of video data to produce a compressed signal. The quantization subsystem includes means for compressing the sequence of video data n times, wherein n≧1, and wherein each compressing of the video data employs a different compression parameter to thereby produce n different compressed video signals. The quantization subsystem further includes means for evaluating picture quality of the n compressed video signals in real time, and means for automatically selecting one of the n compressed video signals for output as the compressed signal, selection of the compressed signal being based upon the evaluation of picture quality thereof.

In another aspect, the invention comprises a digital video encoder which includes a quantizer and logic for automatically evaluating in real time data loss resulting from quantization of the video data. The quantizer produces a quantized video signal from a received video signal, while the logic for automatically evaluating evaluates data loss resulting from quantization of the received video signal. This evaluation of data loss is then used to decide whether to output the quantized video signal for further encoding or whether to requantize the received video signal using a different quantization scale.

In a further aspect, the invention comprises a computer program product including a computer usable medium having computer readable program code means therein for use in encoding the sequence of video data. The computer readable program code means in the computer program product includes computer readable program code means for causing a computer to affect compressing the sequence of video data to produce a compressed signal, the compressing including: (i) compressing the sequence of video data n times, wherein n≧1, and wherein each compressing (i) employs at least one different compressing parameter, thereby producing n different compressed video signals; (ii) evaluating picture quality of the n compressed video signals in real time; and (iii) automatically selecting one of the n compressed video signals for output as the compressed signal, the automatically selecting being based upon the evaluating (ii) of picture quality.

In a still further aspect, the invention comprises a computer program product including a computer usable medium having computer readable program code means therein for use in encoding a video signal. The computer readable program code means for causing a computer to affect encoding of the video signal includes: (i) compressing the video signal to produce a compressed video signal; and (ii) automatically evaluating in real time data loss resulting from the compressing (i) of the video signal and producing therefrom loss statistics representative of picture quality of the compressed video signal, wherein the automatically evaluating occurs during encoding of the video signal.

To restate, picture quality "estimation" in accordance with this invention provides real-time feedback within the encoder on the quality of a macroblock or block being produced. With this real-time feedback, compression parameters can be dynamically adjusted, for example, to improve picture quality of the compressed signal before forwarding of the signal along the encode pipeline. More particularly, picture quality can be compared in real time against a predefined noise threshold, and if quality exceeds the noise threshold then parameters can be adjusted and the video data recompressed using the new parameters.

Alternatively, in accordance with the principles of this invention multiple quantizers can be employed in parallel, each using a different quantizer scale. A macroblock of compressed data can then be chosen as the output of the quantizer producing an appropriate quality level. If multiple compressed signals satisfy the quality level, then the signal having the largest quantization scale is preferably used. Further, the invention can be used to evaluate picture quality for intra or non-intra macroblocks and this information can be employed to identify when one type (i.e., intra or non-intra) of coding is significantly better than another.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
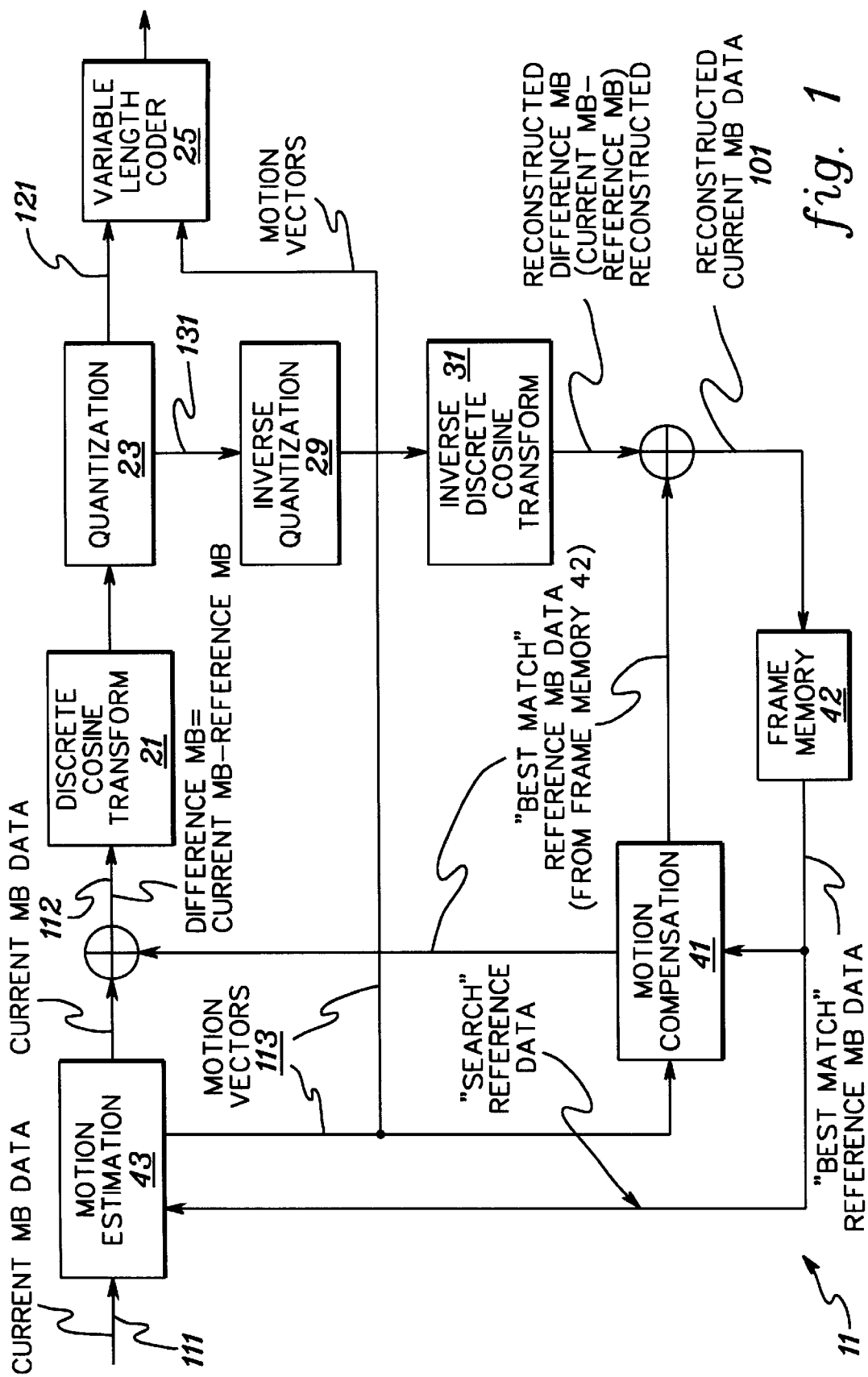
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the ith picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the $i+1^{th}$ is being encoded with motion estimation.

The invention relates, for example, to MPEG compliant encoders and encoding processes such as described in "Information Technology-Generic coding of moving pictures and associated audio information: Video," Recommendation ITU-T H.262, ISO/IEC 13818-2, Draft International Standard, 1994. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in a still picture of an "I" frame picture. Spatial redundancy is the redundancy within a picture. The MPEG-2 Draft Standard is using a block based method of reducing spatial redundancy. The method of choice is the discrete cosine transformation, and discrete cosine transform coding of the picture. Discrete cosine transform coding is combined with weighted scalar quantization and run length coding to achieve desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the $i^{th}$ picture will be in the $i-1^{th}$ or $i+1^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the $i^{th}$ picture and the $i+1^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the $i^{th}$ picture to the $i+1^{th}$ picture.

As shown in FIG. 1, in the encoding process, the images of the $i^{th}$ picture and the $i+1^{th}$ picture are processed in the encoder 11 to generate motion vectors which are the form in which, for example, the $i+1^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation Unit 41 to retrieve macroblock data from previous and/or future pictures, referred to as "reference" data, for output by this unit. One output of the motion compensation Unit 41 is negatively summed with the output from the motion estimation unit 43 and goes to the input of the Discrete Cosine Transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
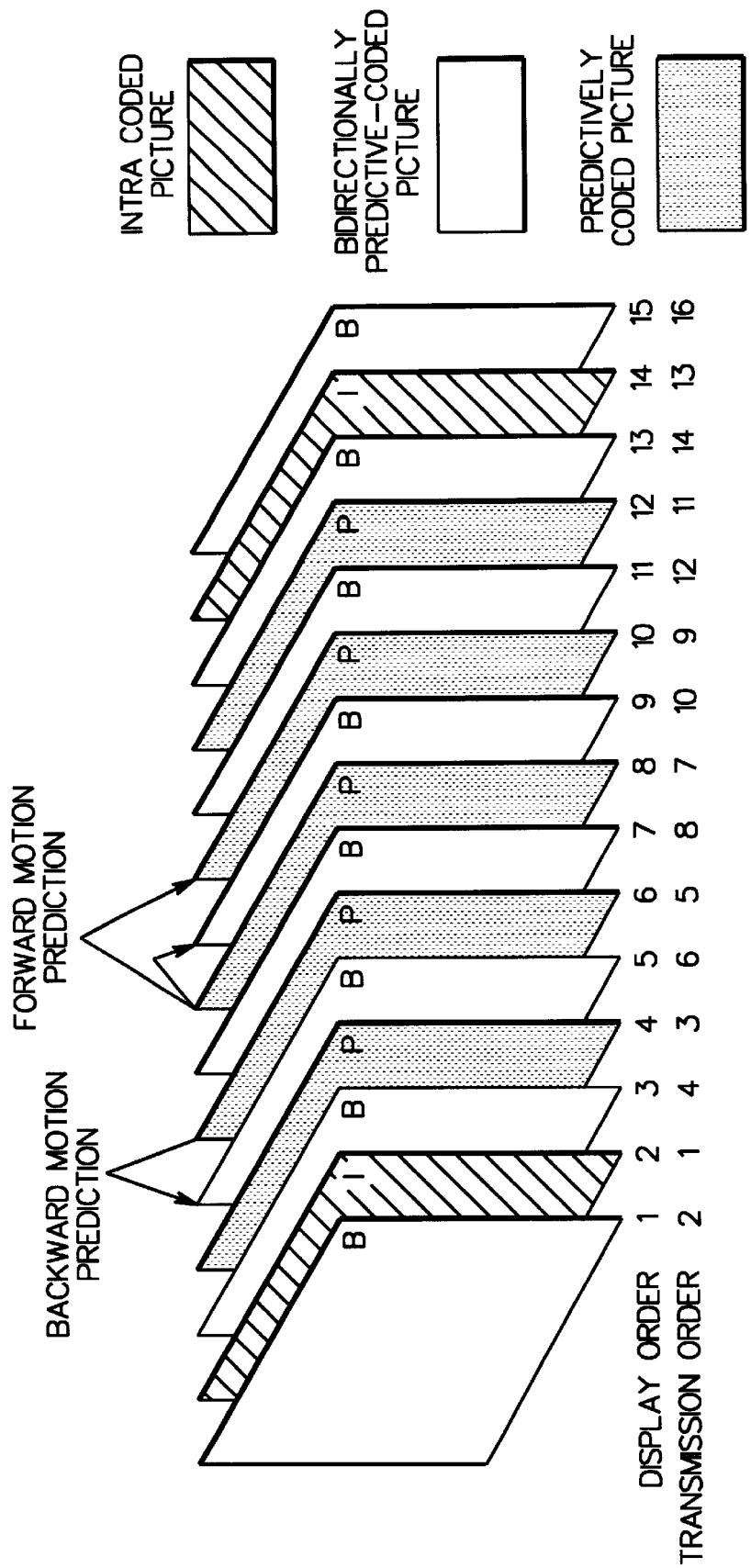
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
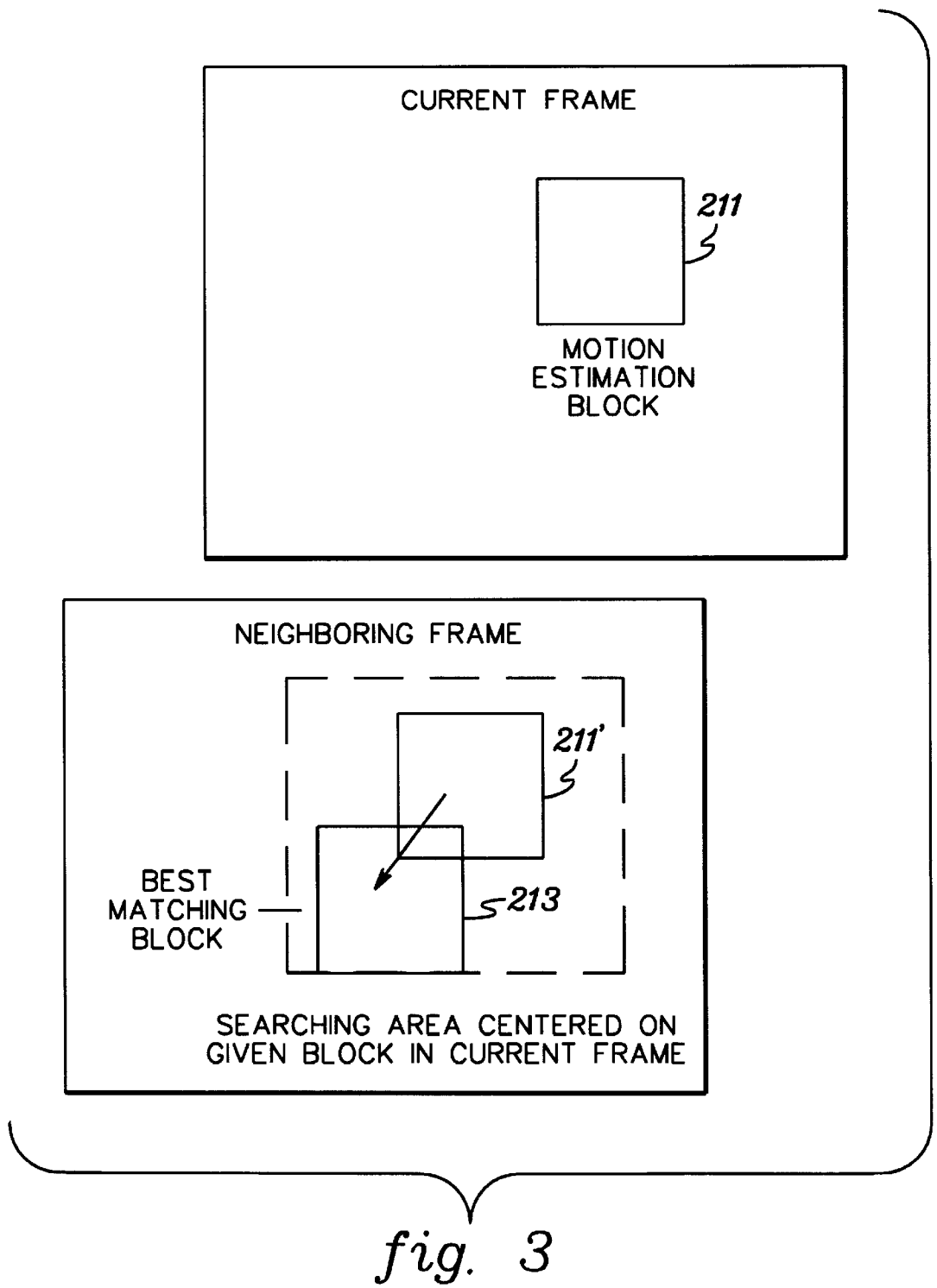
FIG. 3 illustrates the search from the motion estimation block in the current frame or picture to the best matching block in a subsequent or previous frame or picture. Elements 211 and 211' represent the same location in both pictures.
Figure 4:
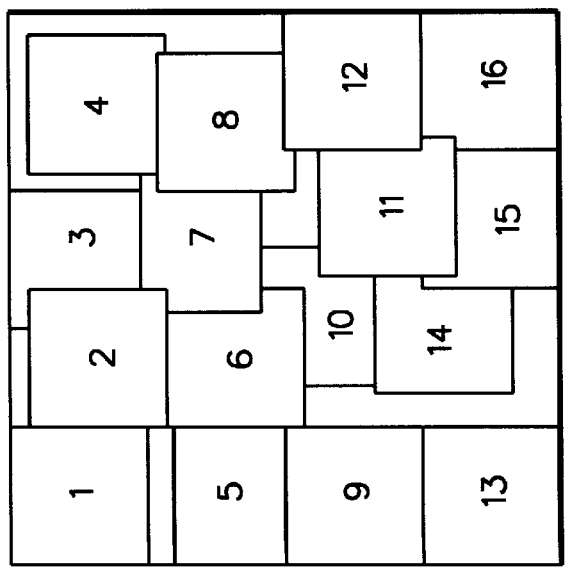
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an ith picture throughout a region of the next picture to find the best match macroblock 213. Translating the macroblocks in this way yields a pattern of macroblocks for the i+1$^{th}$ picture, as shown in FIG. 4. In this way the i$^{th}$ picture is changed a small amount, e.g., by motion vectors and difference data, to generate the i+1$^{th}$ picture. What is encoded are the motion vectors and difference data, and not the i+1$^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the i$^{th}$ picture as in the i+1$^{th}$ picture. A search window is created in the it picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in detail in commonly assigned, co-pending U.S. patent application Ser. No. 08/831,157, by Carr et al., filed Apr. 1, 1997, entitled "Control Scheme For Shared-Use Dual-Port Predicted Error Array," which is also hereby incorporated herein by reference in its entirety.

As noted initially, encoder performance and/or picture quality may be enhanced in accordance with the principles of this invention through certain real-time adaptive video encoding techniques. In particular, in accordance with the principles of this invention, the video encoder includes real-time picture quality evaluation commensurate with lossy compression of the video data to enable dynamic adjustment of the lossy compression function. For example, the quantization scale could be adjusted in order to optimize picture quality using a least number of bits. In a preferred approach to be described below, multiple quantizers are employed in parallel, each using a different quantization scale to compress an original version of a sequence of video data, such as a macroblock of data. Loss data is accumulated from the output of each quantizer and converted into quantization loss statistics. The quantization loss statistics are compared and an output of one of the quantizers is selected, for example, such that the corresponding quantization loss statistic is below a predefined threshold while the quantization scale employed in producing the compressed video data is largest. Other implementations will also be described.

In general, the present invention discloses that picture quality, i.e., an indication of signal-to-noise ratio (SNR), of the encoded signal can be predicted within the encoder at the time of lossy compression. This real time "prediction" is made in order to select or generate an optimum lossy compression approach.

Conventionally, the signal-to-noise ratio (SNR) of MPEG video is the difference between the original picture data stream before encoding and the picture data stream after decoding of the encoded stream. To calculate SNR one must therefore encode and then decode the picture. This approach provides accurate values but allows no time to then re-encode the original picture data stream to correct an identified problem.

In accordance with the principles of this invention, the signal-to-noise ratio is "estimated" at the time of lossy compression through a determination of the "quantization loss statistics" described herein. By making this estimation, there is sufficient time to dynamically adapt encoding of a macroblock(s) that exceeds a predefined quality threshold. Further, the quantization loss statistics can be employed to distinguish among multiple quantized signals produced in parallel to enable selection of the compressed signal having the largest quantization scale and not exceeding a predefined quality threshold.

As explained above, in accordance with MPEG encoding, video data such as a macroblock of a frame is first transformed by a discrete cosine transform (DCT) function well known in the art. This transformed signal (herein referred to as a "frequency domain signal") then undergoes lossy compression within a quantizer. The quantizer employs one or more adjustable parameters, including a quantization scale and quantizer tables, which are explained below.

In accordance with one embodiment of the present invention, the lossy compressed signal from the inverse quantizer is compared with a delayed version of the original data, i.e, the frequency domain signal from the DCT unit. This comparison produces an array of difference coefficients, which are then scaled, weighted and added together to produce quantization loss statistics (QLS) for each block of a macroblock and each macroblock of a frame. If the QLS for a particular macroblock exceeds a predefined threshold value, then the quantization level is preferably adjusted for that macroblock to decrease data loss. Because this is accomplished at macroblock level, quality improvements are realized during real-time encoding of the data. Thus, in accordance with the present invention, real-time dynamic control of the quantization process is achieved.

Figure 5:
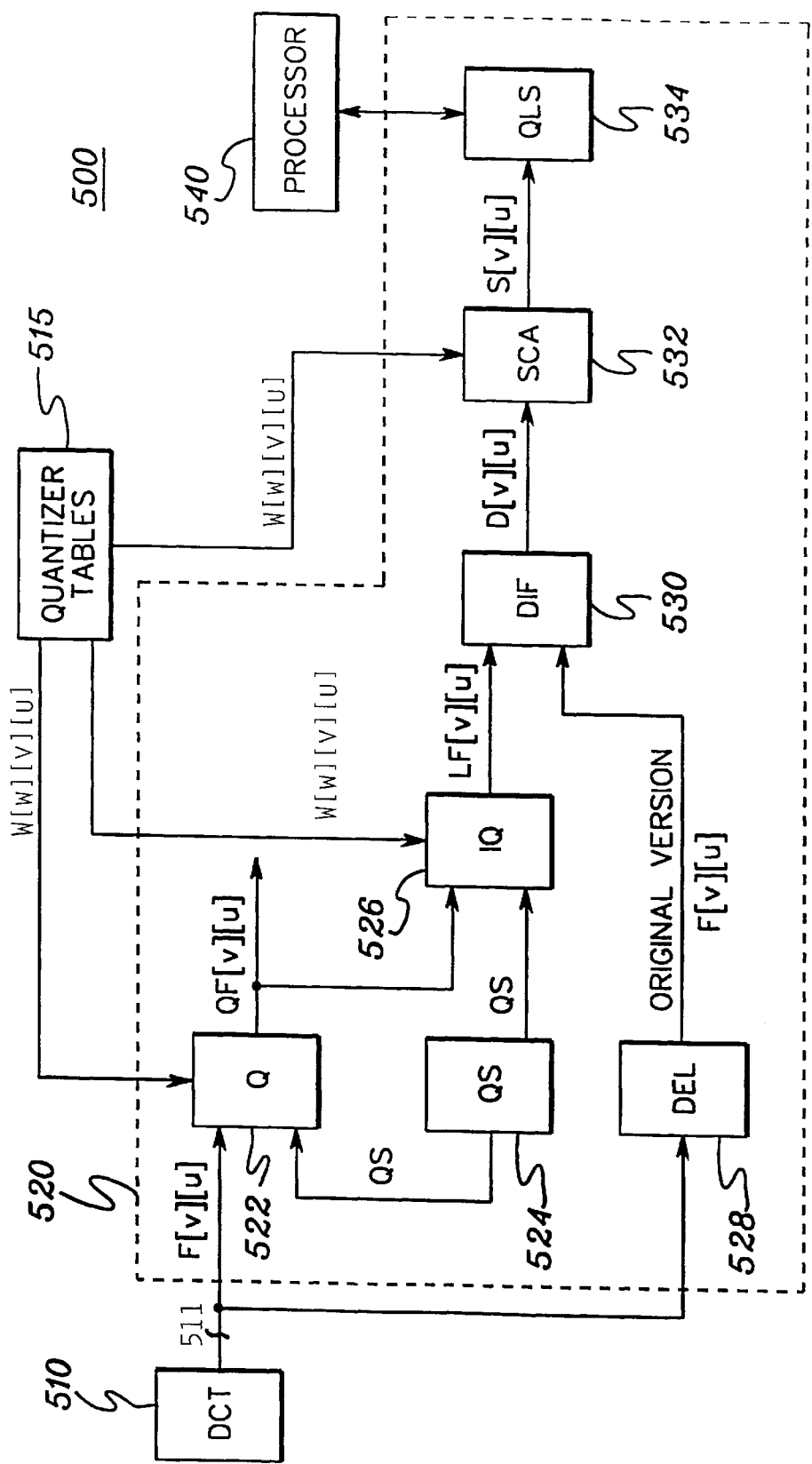
FIG. 5 shows a flow diagram of an encoding system employing one embodiment of real-time quality evaluation in accordance with the principles of the present invention. This embodiment employs inverse quantization of the compressed data and comparison of the resultant video data with the original video data to generate a difference signal (e.g., a block of difference coefficients) which is then scaled and used to produce quantization loss statistics indicative of the quality of the compressed data.

FIG. 5 depicts one partial embodiment of an encoder, generally denoted 500, in accordance with the present invention. This encoder includes a discrete cosine transform (DCT) unit 510 and a quantization unit 520 modified pursuant to the present invention. Also shown are conventional quantizer tables 515 which provide weighting factors to a quantizer Q 522 for use during quantization of the blocks (or macroblocks) of data. In one implementation, each macroblock may comprise an array of 16×16 coefficients and be divided into four quadrants or four blocks of 8×8 coefficients. This array of 64 coefficients is referred to as a "block of data".

As shown, the frequency domain signal F[v][u] output on line 511 from DCT unit 510 is fed to quantizer Q 522 where the signal undergoes lossy compression, and is output as a compressed video signal QF[v][u]. Quantization is achieved, for example, by employing a default weighting matrix W[v][u] for intra blocks and non-intra blocks as shown in the tables below. These default matrices are established by MPEG Standard. The quantizer tables 515 provide a weight to each matrix term to guide the amount of quantization. As would be understood by those skilled in the art, intra blocks are scaled in order to preserve the information content of the more important coefficients in the matrix.

The MPEG default matrix for intra blocks (both luminance and chrominance) is shown in Table 1.

TABLE 1

(W [0] [v] [u])

| 8  | 16 | 19 | 22 | 26 | 27 | 29 | 34 |
|----|----|----|----|----|----|----|----|
| 16 | 16 | 22 | 24 | 27 | 29 | 34 | 37 |
| 19 | 22 | 26 | 27 | 29 | 34 | 34 | 3S |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

The MPEG default matrix for non-intra blocks (both luminance and chrominance) is shown in Table 2.

TABLE 2

(W [1] [v] [u])

| 16 | 16 | 16 | 16 | 16 | 16 | 16 | 16 |
|----|----|----|----|----|----|----|----|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

Quantizer 522 also requires a quantization scale QS 524 to produce the compressed video signal QF[v][u]. The setting of quantization scale (QS) can be pursuant to a bit rate control algorithm resident, for example, with a processor 540 of the encoder 500. Note that this invention is independent of the scheme employed to generate the quantization scale QS. The quantization scale comprises a divide by factor used by quantizer 522 in lossy compressing the frequency domain signal F[v][u].

The MPEG Standard defines the inverse quantization to be used in the decoder. With this, the equation for a quantizer can be derived. The major contributor to the loss of compression in the quantizer can be found in equation 1 below.

$$QF[v][u] = \frac{\left[\frac{F[v][u] \cdot 32}{(W[w][v][u] \cdot QS)} - K\right]}{2} \tag{1}$$

where:
W[w][v][u] is the appropriate quantizer table value per MPEG Standard. The default tables are shown as Table 1 and Table 2.
K=0 sign (F[v][u])
   for intra macroblocks
   for non-intra macroblocks
sign(x)=1 for x>0
   0 for x=0
   −1 for x<0

Continuing with FIG. 5, in accordance with this embodiment of the invention, quantized data QF[v][u] undergoes inverse quantization (IQ) 526 to restore the data to a lossy version LF[v][u] of the original data F[v][u]. For purposes of decoding an encoded signal, the MPEG Standard defines inverse quantization. Within this standard, certain lossy functions are implemented. Relevant portions of the standard are set forth as equation (2) below.
   if (macroblock_intra)

$$F[v][u]=(QF[v][u] \cdot W[w][v][u] \cdot QS \cdot 2)/32;$$

else $$F[v][u]=(((QF[v][u] \cdot 2)+\text{Sign}(QF[v][u])) \cdot W[w][v][u] \cdot QS)/32 \tag{2}$$

As shown in FIG. 5, this lossy data version LF[v][u] is provided to a difference (DIF) unit 530. Also input to unit 530 is the original data F[v][u] through an appropriate delay (DEL) 528. The output of comparison 530 comprises an array of difference coefficients D[v][u]. One equation for producing the difference signal is shown as equation (3) below.

$$D[v][u]=F[v][u]-LF[v][u] \tag{3}$$

After determining D[v][u], difference data D[v][u] is input to a scaling (SCA) unit 532. As noted, quantization of a macroblock is not constant over all coefficients of the macroblock. In particular, quantization varies according to the values in the quantizer tables 515. Coefficients that are less important are quantized more and are expected to have larger differences. Before summing the differences D[v][u], therefore, the terms in each matrix should be weighted with respect to the quantizer tables 515. This is done within scaling unit 532, producing a scaled output matrix S[v][u].

More particularly, scaling of each difference coefficient employs the appropriate quantizer table values to weight each difference coefficient based on whether the current block comprises an intra block or a non-intra block. The output signal S[v][u] is defined as follows:

$$S[v][u]=D[v][u]/(W[w][v][u] \cdot X) \tag{4}$$

Where X≦1. Scaling using a variable X is desirable in order to achieve granularity in the difference coefficients. Essentially, choosing X<1 dictates dividing the difference data by a fraction of the corresponding quantizer value. Also, by selecting X=1/16 no weighting needs to be given to the high frequency terms in non-intra macroblocks since the non-intra default matrix is all 16. Thus, by choosing X=1/16, S[v][u]=D[v][u] for non-intra macroblocks, which simplifies the calculation.

The quantization loss statistics are calculated by summing the absolute value of each S[v][u] coefficient, i.e., the absolute scaled differences output from SCA unit 532. If the sum exceeds a predefined threshold, then the input frequency domain matrix F[v][u] can be quantized again using, e.g., a different quantization scale (QS). The quantization loss statistics may indicate a largest quantization scale or a maximum quantization acceptable, or they may indicate that new quantizer tables should be loaded for the next picture. In FIG. 5, the quantizer loss statistics 534 are provided to an encode processor 540, for example, for feedback in selecting a next quantization scale QS employing a predefined bit rate control algorithm.

Figure 6:
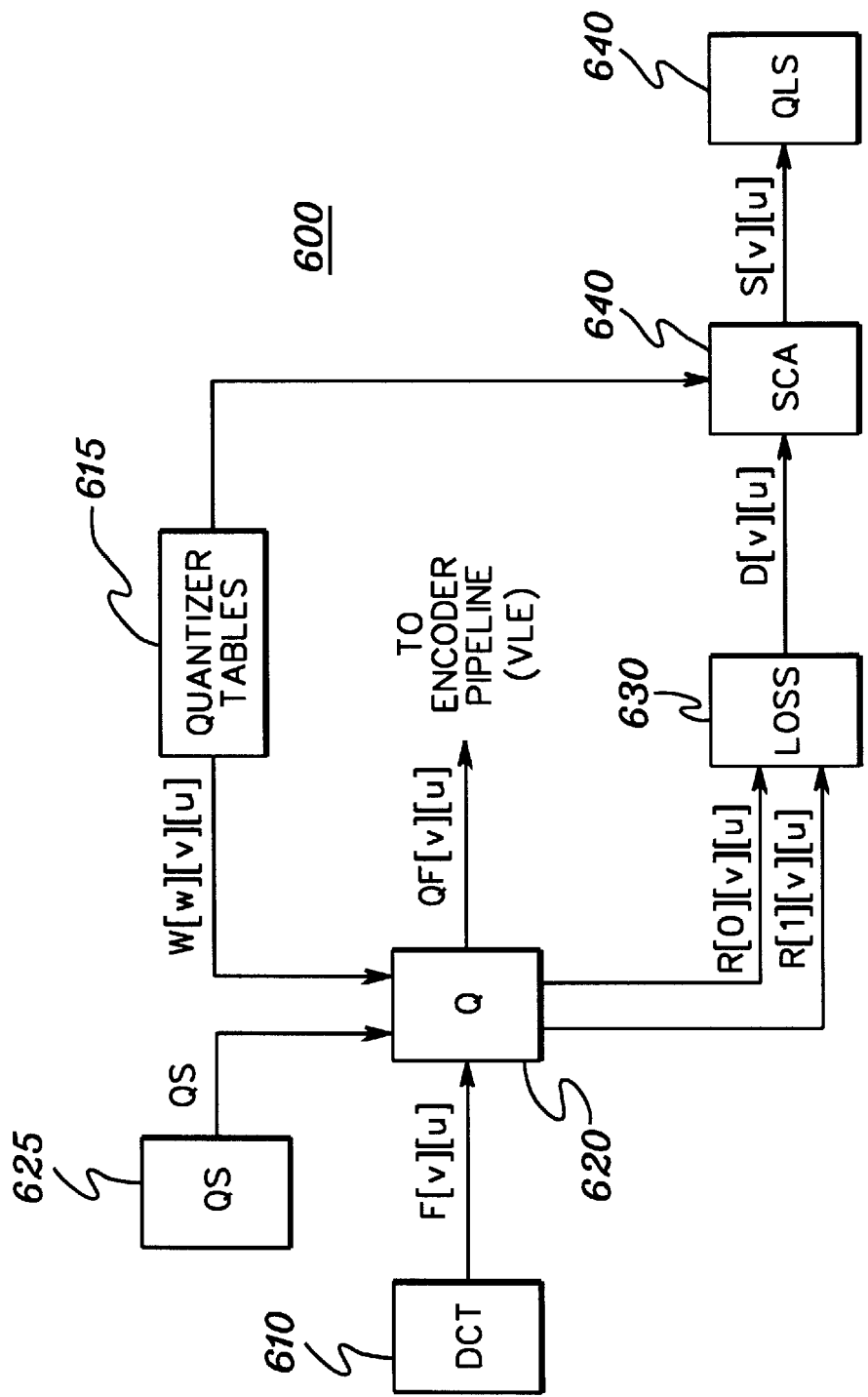
FIG. 6 is a flow diagram of an alternate embodiment of an encoding system in accordance with the present invention wherein remainders from the quantization process are employed in evaluating data loss of the compressed data. The data loss is again scaled and used to produce quantization loss statistics representative of picture quality of the quantized video data.

FIG. 6 depicts an alternate embodiment of an encoder 600 in accordance with the principles of this invention. This embodiment recognizes that logic or programming space is realized by embedding the inverse quantization and difference units/steps described above in connection with FIG. 5 within the quantizer Q 620 itself. As shown, the main content of the loss D[v][u] can be derived from the remainders R[0][v][u] and R[1][v][u] of the division steps of quantization Q.

Describing FIG. 6, a discrete cosine transform (DCT) unit 610 provides frequency domain signals F[v][u] to quantizer Q 620. Quantizer 620 again uses a quantizer scale (QS) 625 and weighting W[w][v][u] from quantizer tables 615 to lossy compress the received signal F[v][u]. The quantizer 620 provides lossy compressed signal QF[v][u] for forwarding within the encoder pipeline, for example, to a variable length encoder (VLE) (not shown). However, forwarding of the lossy compressed signal is delayed pending picture quality evaluation in accordance with this invention.

Output from quantizer 620 are remainders R[0][v][u] & R[1][v][u] resulting from the division step implemented within the quantizer. These remainders are employed by a loss unit 630 to derive difference data D[v][u], which is essentially the same difference data as provided by difference unit 530 in the embodiment of FIG. 5. By way of example, for each coefficient [v][u] of a block of coefficients the loss unit 630 outputs a loss prediction calculation determined by the following equation.

$$D[v][u] = \frac{R0[v][u] + (W[w][v][u] \cdot QS \cdot R[1][v][u])}{32}$$

wherein:

$$R[0][v][u] = (F[v][u] \cdot 32)\%(W[w][v][u] \cdot QS)$$

$$R[1][v][u] = \left[\frac{(F[v][u] \cdot 32)}{W[w][v][u] \cdot QS} - K\right]\% 2$$

%=modulus operation

Note: The equations are assuming division with truncation.

In the case where the division steps can round to the nearest integer, R[0][v][u] and R[1][v][u] will be the minimum of the remainder of the division step and the difference between the divisor and the remainder. In the case of rounding down of a coefficient during quantization, the remainder R[0][v][u] or R[1][v][u] will be the minimum, while if roundup occurs during quantization the difference between the divisor and the remainder R[0][v][u] or R[1][v][u] for each quantized coefficient will be the minimum.

Each difference term then undergoes scaling at unit 640 as described above in connection with scaling unit 532 of FIG. 5. Weighting W[w][v][u] and scaling factor X are again used as defined in equation (4) above to produce the scaled matrix S[v][u]. The scaled matrix is output to quantization loss statistics (QLS) unit 650 which, e.g., sums the absolute scaled differences. A processor (not shown) then compares the sum for each block or each macroblock to a predefined threshold of allowable noise. If the threshold is exceeded, the quantizer scale is adjusted and the original data F[v][u] is re-quantized, all in real time.

Figure 7:
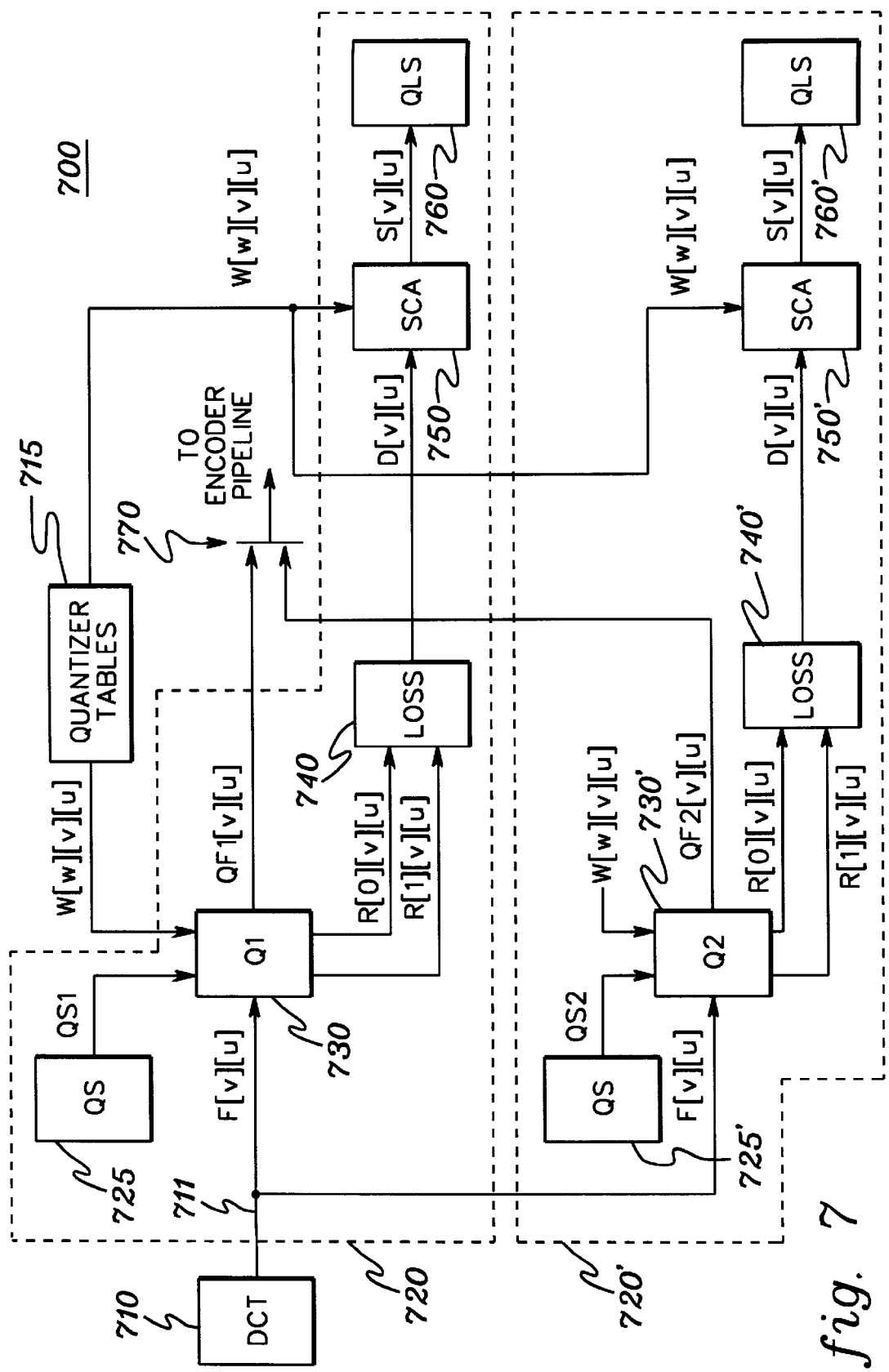
FIG. 7 shows a flow diagram of an encoding system in accordance with the present invention wherein the approach of FIG. 6 is implemented multiple times in parallel. Each of the parallel operating quantizers employs a different quantization scale, thereby producing differently quantized, compressed data signals QF1[v][u], QF2[v][u], etc. The quantized video data with an optimum compressed picture quality can be selected for forwarding along the encode pipeline.

FIG. 7 depicts still another embodiment of an encoder, generally noted 700, in accordance with the principles of this invention. In this time-critical noise prediction embodiment, multiple quantization subunits 720,720' . . . are employed in parallel to quantize the frequency domain signal F[v][u]. Each subunit has a quantizer Q1,Q2 730,730' which uses a different quantization scale QS1,QS2. Thus, each quantizer Q1,Q2 will produce different predicted loss statistics (QLS). The best quantized output is then chosen for completing the encoding process, e.g., through control of a select unit 770.

In a three-quantizer approach, the calculated quantization scale determined by a bit rate control algorithm might be provided to a first quantizer Q1, a slightly larger quantized scale provided to a quantizer Q2 and a slightly smaller quantized scale to a quantizer Q3. Since each quantizer is running in parallel, there is little overhead in calculating multiple quantizer outputs. The quantizer that meets an acceptable QLS with the largest amount of quantization is preferably chosen for forwarding in the encoder pipeline.

As shown in FIG. 7, a sequence of video data is transformed by DCT 710 into a frequency domain signal F[v][u] which is then quantized in parallel in multiple quantizers Q1,Q2 730,730'. Quantizer Q1 receives a quantization scale QS1 725, e.g., from a rate control algorithm, while quantizer Q2 receives a different quantization scale QS2 725'. Both quantizers also receive weighting information from quantizer tables 715 in the form of weighting matrix W[w][v][u]. The output of each quantizer QF1[v][u], QF2[v][u] is sent to select device 770. Only one of these quantized outputs will be forwarded to the encoder pipeline for further processing.

Each encode subunit 720,720' comprises an implementation as depicted in FIG. 6. In particular, the remainder values R[0][v][u] and R[1][v][u] are forwarded from the respective quantizers Q1,Q2 to loss units 740,740' for determination of difference matrices D[v][u] as explained above. These difference matrices are scaled using weighting W[w][v][u] from the quantizer tables 715 and an appropriate scaling term X, wherein X≦1. The scaled coefficients S[v][u] are summed in QLS units 760,760' to determine corresponding quantization loss statistics. Since only one quantized signal QF1[v][u], QF2[v][u] can be chosen, the QLS that meets an acceptable predefined threshold and has the largest quantization is preferably selected. By choosing the quantizer that has an acceptable QLS and the largest quantization, bits are saved while still achieving a desired picture quality.

To summarize, the conventional approach to determining signal-to-noise ratio involves full encoding and then decoding of a picture prior to analysis. Unfortunately, this leaves no time to then re-encode to correct problem areas of a frame, at least not in a real-time encoding system. The present invention addresses this problem by estimating the signal-to-noise ratio through a unique evaluation of lossy compression within the quantizer or quantize subsystem. The invention can be implemented at the macroblock or block level, and will allow sufficient time to re-encode macroblocks that fail to meet a predefined noise threshold. Thus, the technique is implementable within a real-time encoder.

In addition, the present invention can be included, for example, in an article of manufacture (e.g., one or more computer program products) having, for instance, computer usable media. The media has embodied therein, for instance, computer readable program code means for providing and facilitating the capabilities of the present invention. The articles manufactured can be included as part of the computer system or sold separately.

The flow diagrams depicted herein are provided by way of example. There may be variations to these diagrams or the steps or operations described herein without departing from the spirit of the invention. For instance, in certain cases the steps may be performed in differing order, or steps may be added, deleted or modified. All these variations are considered to comprise part of the present invention as recited in the appended claims.

While the invention has been described in detail herein in accordance with certain preferred embodiments thereof, many modifications and changes therein may be affected by those skilled in the art. Accordingly, it is intended by the appended claims to cover all such modifications and changes as fall within the true spirit and scope of the invention.

What is claimed is:

1. A method for encoding a sequence of video data, said method comprising:
   compressing the sequence of video data to produce a compressed signal, said compressing comprising:
   (i) compressing the sequence of video data n times, wherein n>1, and wherein each compressing (i) of the sequence of video data said n times employs at least one different compression parameter, thereby producing n different compressed video signals from the same sequence of video data, (ii) evaluating picture quality of said n compressed video signals in real-time, wherein said evaluating comprises comparing data loss information derived from each of said n compressed video signals, and (iii) automatically selecting one of said n compressed video signals for output as said compressed signal, said automatically selecting being based upon said evaluating (ii) of picture quality.

2. The method of claim 1, wherein said compressing (i) comprises lossy compressing said sequence of video data, and wherein said evaluating picture quality (ii) comprises for each of said n compressed video signals evaluating data loss resulting from said lossy compressing (i) of said sequence of video data.

3. The method of claim 1, wherein said compressing of the sequence of video data comprises quantizing the sequence of video data to produce said compressed signal, and wherein said compressing (i) comprises quantizing (i) the sequence of video data n times, each quantizing employing a different quantization scale, thereby producing said n different compressed video signals.

4. The method of claim 3, wherein said evaluating (ii) of picture quality comprises for each compressed video signal of said n compressed video signals estimating in real time data loss occurring from said quantizing (i).

5. A method for encoding a sequence of video data, said method comprising:

compressing the sequence of video data to produce a compressed signal, said compressing comprising:

(i) compressing the sequence of video data n times, wherein n≧1, and wherein each compressing (i) of said n times employs at least one different compression parameter, thereby producing n different compressed video signals, (ii) evaluating picture quality of said n compressed video signals in real-time, (iii) automatically selecting one of said n compressed video signals for output as said compressed signal, said automatically selecting being based upon said evaluating (ii) of picture quality;

wherein said evaluating (ii) of picture quality comprises for each compressed video signal of said n compressed video signals estimating in real-time data loss occurring from said quantizing (i); and wherein each of said n compressed video signals comprises a block of coefficients, and wherein said estimating of data loss comprises for each compressed video signal producing a block of difference coefficients representative of said data loss, and wherein said evaluating (ii) further comprises scaling said block of difference coefficients produced for each compressed video signal and producing therefrom quantization loss statistics representative of data loss of said compressed video signal.

6. The method of claim 5, wherein said producing of quantization loss statistics comprises for each compressed video signal summing the scaled difference coefficients in said block of scaled difference coefficients to produce said quantization loss statistics for said block.

7. The method of claim 5, wherein said scaling further comprises for each compressed video signal weighting each difference coefficient of said block of difference coefficients, wherein for each difference coefficient said weighting is based on location of said difference coefficient within said block of difference coefficients if said block comprises an intra block.

8. The method of claim 5, wherein said automatically selecting (iii) further comprises automatically selecting a compressed video signal of said n compressed video signals which has quantization loss statistics within a predefined range of acceptable quantization loss statistics.

9. The method of claim 5, wherein said automatically selecting (iii) further comprises automatically comparing the quantization loss statistics of each compressed video signal to a predefined threshold and selecting a compressed video signal obtained using a largest quantization scale in said quantizing (i) and having quantization loss statistics below said predefined threshold.

10. A method for encoding a sequence of video data, said method comprising:

compressing the sequence of video data to produce a compressed signal, said compressing comprising:

(i) compressing the sequence of video data n times, wherein n≧1, and wherein each compressing (i) of said n times employs at least one different compression parameter, thereby producing n different compressed video signals, (ii) evaluating picture quality of said n compressed video signals in real-time, (iii) automatically selecting one of said n compressed video signals for output as said compressed signal, said automatically selecting being based upon said evaluating (ii) of picture quality;

wherein said evaluating (ii) of picture quality comprises for each compressed video signal of said n compressed video signals estimating in real-time data loss occurring from said quantizing (i); and wherein estimating said data loss occurring from said quantizing (i) comprises for each coefficient of each compressed video signal determining a minimum of a remainder, produced by quantizing a corresponding coefficient of the sequence of video data with a corresponding quantization divisor used to produce said compressed video signal, or the corresponding quantization divisor minus the remainder.

11. The method of claim 1, further comprising transforming the sequence of video data into a frequency domain signal prior to said compressing, and wherein said compressing comprises compressing the frequency domain signal to produce said compressed signal.

12. The method of claim 1, wherein said compressing (i) comprises employing n quantizers in parallel to compress the sequence of video data n times.

13. The method of claim 1, wherein said sequence of video data comprises a macroblock of a video frame, and wherein said method comprises repeating said compressing of the sequence of video data for each macroblock of said video frame.

14. A method for encoding a video signal, said method comprising:

encoding the video signal, said encoding comprising:

(i) compressing the video signal to produce a compressed video signal; and (ii) automatically evaluating in real time data loss resulting from said compressing (i) of said video signal and producing therefrom loss statistics representative of picture quality of said compressed video signal, wherein said automatically evaluating occurs during encoding of said video signal.

15. The method of claim 14, wherein said compressing (i) comprises quantizing the video signal using a quantization scale to produce said compressed video signal, and wherein said encoding further comprises providing a new quantization scale if said loss statistics exceed a predefined threshold, and repeating compressing of said video signal in real time using said new quantization scale.

16. The method of claim 15, further comprising employing said compressed signal in further encoding if said loss statistics are less than said predefined threshold.

17. A method for encoding a video signal, said method comprising:
   encoding the video signal, said encoding comprising:
      (i) compressing the video signal to produce a compressed video signal;
      (ii) automatically evaluating in real-time data loss resulting from said compressing (i) of said video signal and producing therefrom loss statistics representative of picture quality of said compressed video signal, wherein said automatically evaluating occurs during encoding of said video signal; and
      wherein said compressing (i) comprises quantizing the video signal to produce said compressed video signal, and wherein said automatically evaluating in real-time (ii) comprises inverse quantizing the compressed video signal to produce a lossy video signal, and comparing a delayed version of the video signal with the lossy video signal to derive said loss statistics representative of picture quality of said compressed video signal.

18. The method of claim 17, wherein said comparing produces a block of difference coefficients, and wherein said automatically evaluating in real time (ii) further comprises scaling said block of difference coefficients and producing therefrom said loss statistics representative of data loss of said compressed video signal.

19. A digital video encoder comprising:
   a quantization subsystem for compressing a sequence of video data to produce a compressed signal, said quantization subsystem comprising:
      means for compressing the sequence of video data n times, wherein n>1, and wherein each compressing of the sequence of video data n times employs a different compression parameter, thereby producing n different compressed video signals from the same sequence of video data,
      means for evaluating picture quality of said n compressed video signals in real-time, wherein said means for evaluating comprises means for comparing data loss information derived from each of said n compressed video signals, and
      means for automatically selecting one of said n compressed video signals for output as said compressed signal, wherein said means for automatically selecting comprises means for basing said selection upon said evaluating of picture quality.

20. The digital video encoder of claim 19, wherein said means for compressing comprises at least one quantizer, and wherein said at least one quantizer employs a different quantization scale for each quantizing of the sequence of video data n times.

21. The digital video encoder of claim 20, wherein said means for evaluating picture quality comprises means for estimating data loss in real time for each compressed video signal produced by said at least one quantizer.

22. A digital video encoder comprising:
   a quantization subsystem for compressing a sequence of video data to produce a compressed signal, said quantization subsystem comprising:
      means for compressing the sequence of video data n times, wherein n≧1, and wherein each compressing of the sequence of video data n times employs a different compression parameter, thereby producing n different compressed video signals,
      means for evaluating picture quality of said n compressed video signals in real-time,
      means for automatically selecting one of said n compressed video signals for output as said compressed signal, wherein said means for automatically selecting comprises means for basing said selection upon said evaluating of picture quality;
   wherein said means for compressing comprises at least one quantizer, and wherein said at least one quantizer employs a different quantization scale for each quantizing of the sequence of video data n times;
   wherein said means for evaluating picture quality comprises means for estimating data loss in real-time for each compressed video signal produced by said at least one quantizer; and
   wherein each of said n compressed video signals comprises a block of coefficients, and wherein said means for estimating data loss comprises for each compressed video signal means for producing a block of difference coefficients representative of said data loss, and wherein said means for evaluating picture quality further comprises means for scaling each block of difference coefficients obtained for each compressed video signal and producing therefrom quantization loss statistics representative of data loss of said compressed video signal.

23. The digital video encoder of claim 22, wherein said means for scaling further comprises means for weighting each difference coefficient of said block of difference coefficients produced for each compressed video signal, wherein for each difference coefficient said weighting is based on location of said difference coefficients if said block of coefficients comprising the compressed video signal comprises an intra block.

24. The digital video encoder of claim 23, wherein said means for automatically selecting further comprises means for automatically comparing the quantization loss statistics of each compressed video signal to a predefined threshold and for selecting a compressed video signal obtained using a largest quantization scale within said at least one quantizer and having quantization loss statistics below said predefined threshold.

25. The digital video encoder of claim 20, wherein said at least one quantizer comprises n quantizers connected in parallel within said quantization subsystem, each of said n quantizers employing a different quantization scale to produce said n different compressed video signals.

26. A digital video encoder comprising:
   a quantizer for producing a quantized video signal from a received video signal; and
   logic for automatically evaluating in real time data loss resulting from said quantizing of said video signal and producing therefrom loss statistics representative of picture quality of said quantized video signal, wherein said logic for automatically evaluating is implemented within said digital video encoder for evaluating said quantized video signal during encoding of the received video signal.

27. The digital video encoder of claim 26, wherein said quantizer produces said quantized video signal using a quantization scale, and wherein said digital video encoder further comprises means for adjusting said quantization scale if said loss statistics representative of picture quality are outside a predefined acceptable range.

28. A digital video encoder comprising:
a quantizer for producing a quantized video signal from a received video signal;
logic for automatically evaluating in real-time data loss resulting from said quantizing of said video signal and producing therefrom loss statistics representative of picture quality of said quantized video signal, wherein said logic for automatically evaluating is implemented within said digital video encoder for evaluating said quantized video signal during encoding of the received video signal; and
wherein said logic for automatically evaluating comprises an inverse quantizer for inverse quantizing the quantized video signal to produce a lossy video signal, and logic for comparing a delayed version of the received video signal with the lossy video signal to derive said loss statistics representative of picture quality of said quantized video signal.

29. The digital video encoder of claim 28, wherein said logic for comparing signals comprises logic for producing a block of difference coefficients, and for scaling said block of difference coefficients and for producing therefrom said loss statistics representative of data loss of said compressed video signal.

30. A digital video encoder comprising:
a quantizer for producing a quantized video signal from a received video signal;
logic for automatically evaluating in real-time data loss resulting from said quantizing of said video signal and producing therefrom loss statistics representative of picture quality of said quantized video signal, wherein said logic for automatically evaluating is implemented within said digital video encoder for evaluating said quantized video signal during encoding of the received video signal; and
wherein said quantizer comprises one quantizer of multiple quantizers connected in parallel within said digital video encoder to produce multiple quantization video signals from said received video signal, each quantizer of said multiple quantizers employing a different quantization scale, and wherein said logic for automatically evaluating comprises logic for automatically evaluating in real-time data loss of each of said quantized video signals, and for selecting an optimum quantization video signal for further encoding within said digital video encoder.

31. A computer program product comprising a computer usable medium having computer readable program code means therein for use in encoding a sequence of video data, said computer readable program code means in said computer program product comprising:
computer readable program code means for causing a computer to affect compressing the sequence of video data to produce a compressed signal, said compressing comprising:
(i) compressing the sequence of video data n times, wherein n>1, and wherein each compressing (i) of the sequence of video data said n times employs at least one different compression parameter, thereby producing n different compressed video signals from the same sequence of video data,
(ii) evaluating picture quality of said n compressed video signals in real-time, wherein said evaluating comprises comparing data loss information derived from each of said n compressed video signals, and
(iii) automatically selecting one of said n compressed video signals for output as said compressed signal, said automatically selecting being based upon said evaluating (ii) of picture quality.

32. The computer readable program code means of claim 31, wherein said computer readable program code means for causing a computer to affect compressing of the sequence of video data comprises computer readable program code means for causing a computer to affect quantizing the sequence of video data to produce said compressed signal, and wherein said compressing (i) comprises quantizing (i) the sequence of video data n times, each quantizing employing a different quantization scale, thereby producing said n different compressed video signals.

33. The computer readable program code means of claim 32, wherein said evaluating (ii) of picture quality comprises for each compressed video signal of said n compressed video signals estimating in real time data loss occurring from said quantizing (i).

34. The computer readable program code means of claim 33, wherein said quantizing (i) comprises quantizing the sequence of video data n times in parallel.

35. A computer program product comprising a computer usable medium having computer readable program code means therein for use in encoding a video signal, said computer readable program code means in said computer program product comprising:
computer readable program code means for causing a computer to affect encoding of the video signal, said encoding comprising:
(i) compressing the video signal to produce a compressed video signal; and
(ii) automatically evaluating in real time data loss resulting from said compressing (i) of said video signal and producing therefrom loss statistics representative of picture quality of said compressed video signal, wherein said automatically evaluating occurs during encoding of said video signal.

36. The computer readable program code means of claim 35, wherein said compressing (i) comprises quantizing the video signal using a quantization scale to produce said compressed video signal, and wherein said computer readable program code means for causing a computer to affect encoding of the video signal further comprises computer readable program code means for causing a computer to affect providing a new quantization scale if said loss statistics exceed a predefined threshold, and repeating compressing of said video signal in real time using said new quantization scale.

37. The computer readable program code means of claim 35, wherein said compressing (i) comprises quantizing the video signal to produce said compressed video signal, and wherein said automatically evaluating in real time (ii) comprises inverse quantizing the compressed video signal to produce a lossy video signal, and comparing a delayed version of the video signal with the lossy video signal to derive said loss statistics representative of picture quality of said compressed video signal.

38. The computer readable program code means of claim 37, wherein said comparing produces a block of difference coefficients, and wherein said automatically evaluating in real time (ii) further comprises scaling said block of difference coefficients and producing therefrom said loss statistics representative of data loss of said compressed video signal.

* * * * *